United States Patent
Yang et al.

(10) Patent No.: US 9,381,607 B2
(45) Date of Patent: Jul. 5, 2016

(54) FEEDING DEVICE AND MACHINE TOOL USING THE SAME

(71) Applicants: Ming-Lu Yang, New Taipei (TW); Tian-En Zhang, Shenzhen (CN); Ya-Dong Zhang, Shenzhen (CN); Jian-Shi Jia, Shenzhen (CN); Yang-Mao Peng, Shenzhen (CN); Wei-Chuan Zhang, Shenzhen (CN); Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(72) Inventors: Ming-Lu Yang, New Taipei (TW); Tian-En Zhang, Shenzhen (CN); Ya-Dong Zhang, Shenzhen (CN); Jian-Shi Jia, Shenzhen (CN); Yang-Mao Peng, Shenzhen (CN); Wei-Chuan Zhang, Shenzhen (CN); Jing-Shuang Sui, Shenzhen (CN); Jian Qu, Shenzhen (CN); Feng-Hua Chen, Shenzhen (CN); Jian-Hua Jia, Shenzhen (CN); Xue Qin, Shenzhen (CN); Zhen-Zhou Tian, Shenzhen (CN); Bao-Peng Li, Shenzhen (CN); Jian-Min Yu, Shenzhen (CN)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 795 days.

(21) Appl. No.: 13/705,611

(22) Filed: Dec. 5, 2012

(65) Prior Publication Data
US 2014/0020525 A1    Jan. 23, 2014

(30) Foreign Application Priority Data
Jul. 20, 2012 (CN) .......................... 2012 1 0252850

(51) Int. Cl.
| | |
|---|---|
| B23C 1/06 | (2006.01) |
| B23Q 1/01 | (2006.01) |
| B23Q 5/34 | (2006.01) |
| B23B 3/06 | (2006.01) |
| B23Q 1/62 | (2006.01) |
| B23Q 5/28 | (2006.01) |
| B23B 5/36 | (2006.01) |

(52) U.S. Cl.
CPC ... *B23Q 5/34* (2013.01); *B23B 3/06* (2013.01); *B23B 5/36* (2013.01); *B23Q 1/012* (2013.01); *B23Q 1/017* (2013.01); *B23Q 1/626* (2013.01); *B23Q 5/28* (2013.01); *Y10T 82/2511* (2015.01); *Y10T 82/2531* (2015.01)

(58) Field of Classification Search
CPC .................. B23Q 11/0816; B23Q 11/0891
USPC .......................................................... 82/142
See application file for complete search history.

(56) References Cited

U.S. PATENT DOCUMENTS 4,346,444 A * 8/1982 Schneider .......... G05B 19/4163
                                                    318/571

(Continued)

FOREIGN PATENT DOCUMENTS

| CN | 201186386 Y | 1/2009 |
| CN | 101480777 A | 7/2009 |

(Continued)

*Primary Examiner* — Will Fridie, Jr.
(74) *Attorney, Agent, or Firm* — ScienBiziP, P.C.

(57) ABSTRACT

A feeding device includes a tool holder, a cutter, a feeding mechanism and a mounting seat. The cutter is positioned on the tool holder. The mounting seat has at least one guiding portion. The tool holder is engaged with the at least one guiding portion. The feeding mechanism drives the tool holder and the cutter to controllably reciprocate along the at least one gliding portion.

17 Claims, 5 Drawing Sheets

(56) References Cited

U.S. PATENT DOCUMENTS

| | | | | |
|---|---|---|---|---|
| 4,451,892 A | * | 5/1984 | McMurtry | G01B 7/008 318/572 |
| 4,741,231 A | * | 5/1988 | Patterson | G01L 1/16 310/338 |
| 7,192,225 B2 | * | 3/2007 | Takayama | B23Q 11/0816 409/134 |
| 8,529,420 B2 | * | 9/2013 | Meidar | B23Q 1/012 29/33 P |
| 2006/0052038 A1 | * | 3/2006 | Klein | B23Q 5/10 451/11 |

FOREIGN PATENT DOCUMENTS

| | | |
|---|---|---|
| DE | 19650360 A1 | 5/1998 |
| EP | 1728576 A2 | 12/2006 |
| TW | 553045 | 9/2003 |
| TW | M286741 | 2/2006 |
| WO | WO03103896 A1 | 12/2003 |

\* cited by examiner

FEEDING DEVICE AND MACHINE TOOL USING THE SAME

CROSS-REFERENCE TO RELATED APPLICATIONS

This application claims all benefits accruing under 35 U.S.C. §119 from China Patent Application No. 201210252850.1, filed on Jul. 20, 2012, in the China Intellectual Property Office, the disclosure of which is incorporated herein by reference. The application is also related to co-pending applications entitled, "MACHINE TOOL WITH UNINTERRUPTED CUTTING" Ser. No. 13/705843; "FEEDING DEVICE AND MACHINE TOOL USING THE SAME" Ser. No. 13/705788; "METHOD FOR MACHINING CURVED SURFACE USING LATHE" Ser. No. 13/705777; "LATHE FOR MACHINING CURVED SURFACES" Ser. No. 13/705713; "LATHE WITH TWO CROSS BEAMS" Ser. No. 13/705585; "LATHE CONTROL SYSTEM" Ser. No. 13/705545; "WORKPIECE HAVING NON-ROTARY SURFACE MACHINED BY LATHE" Ser. No. 13/705478; "LATHE FOR MACHINING CURVED SURFACES" Ser. No. 13/705383.

BACKGROUND

1. Technical Field

The present disclosure generally relates to feeding devices, and particularly, to a feeding device which can machine a curved surface, and a machine tool using the same.

2. Description of the Related Art

In the manufacturing field, a cutter of the machine tool is driven to move by a feeding device of the machine tool, and also driven to rotate in high speed by a main shaft of the machine tool at the same time for machining a curved surface of a workpiece. However, after completing machining a first position of the workpiece, the feeding device needs to be driven to lift and move a certain distance to a second position of the workpiece by the main shaft. This consumes more time, and the machining efficiency is decreased.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
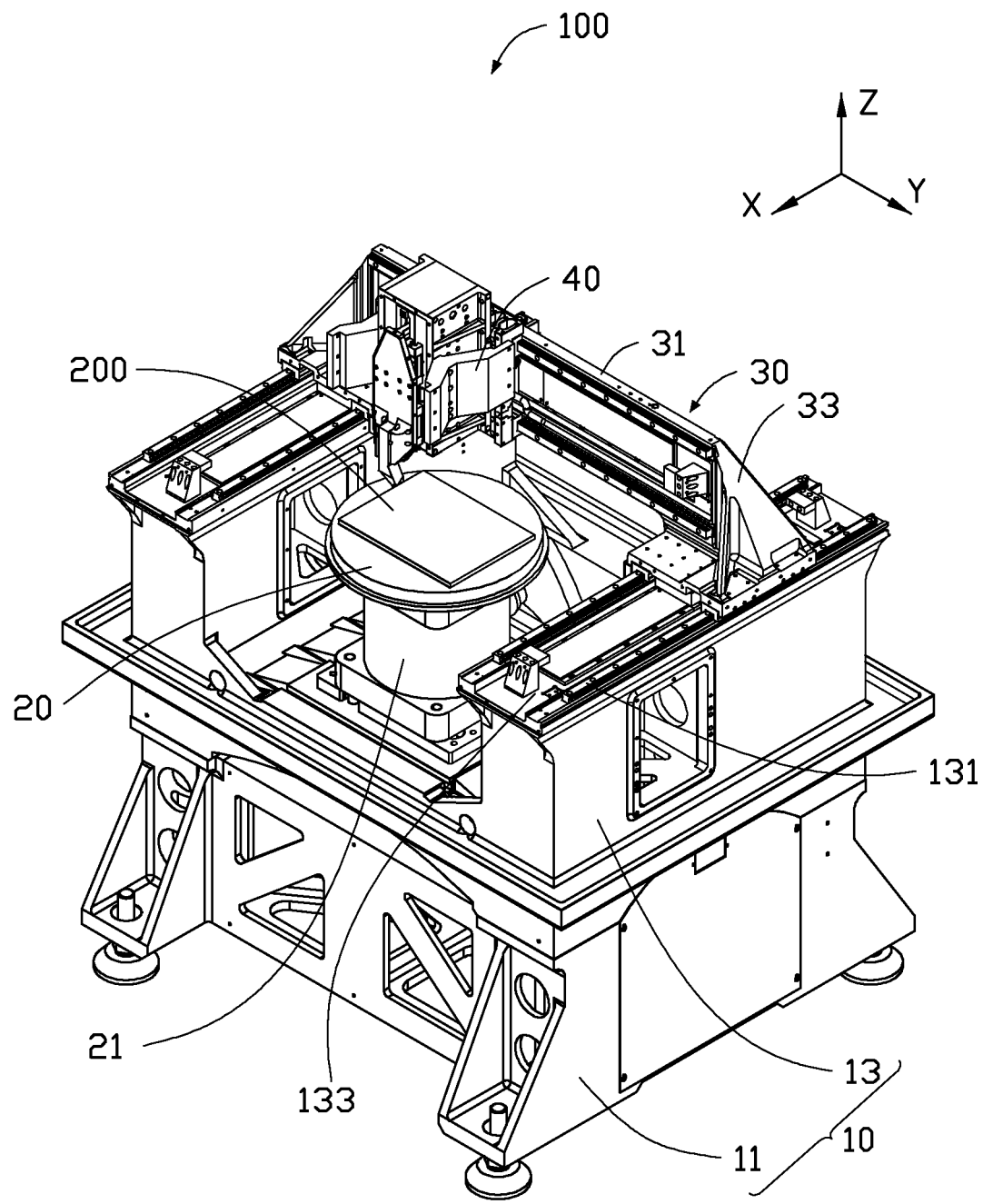
FIG. 1 is an isometric view of an embodiment of a machine tool having a feeding device.
Figure 2:
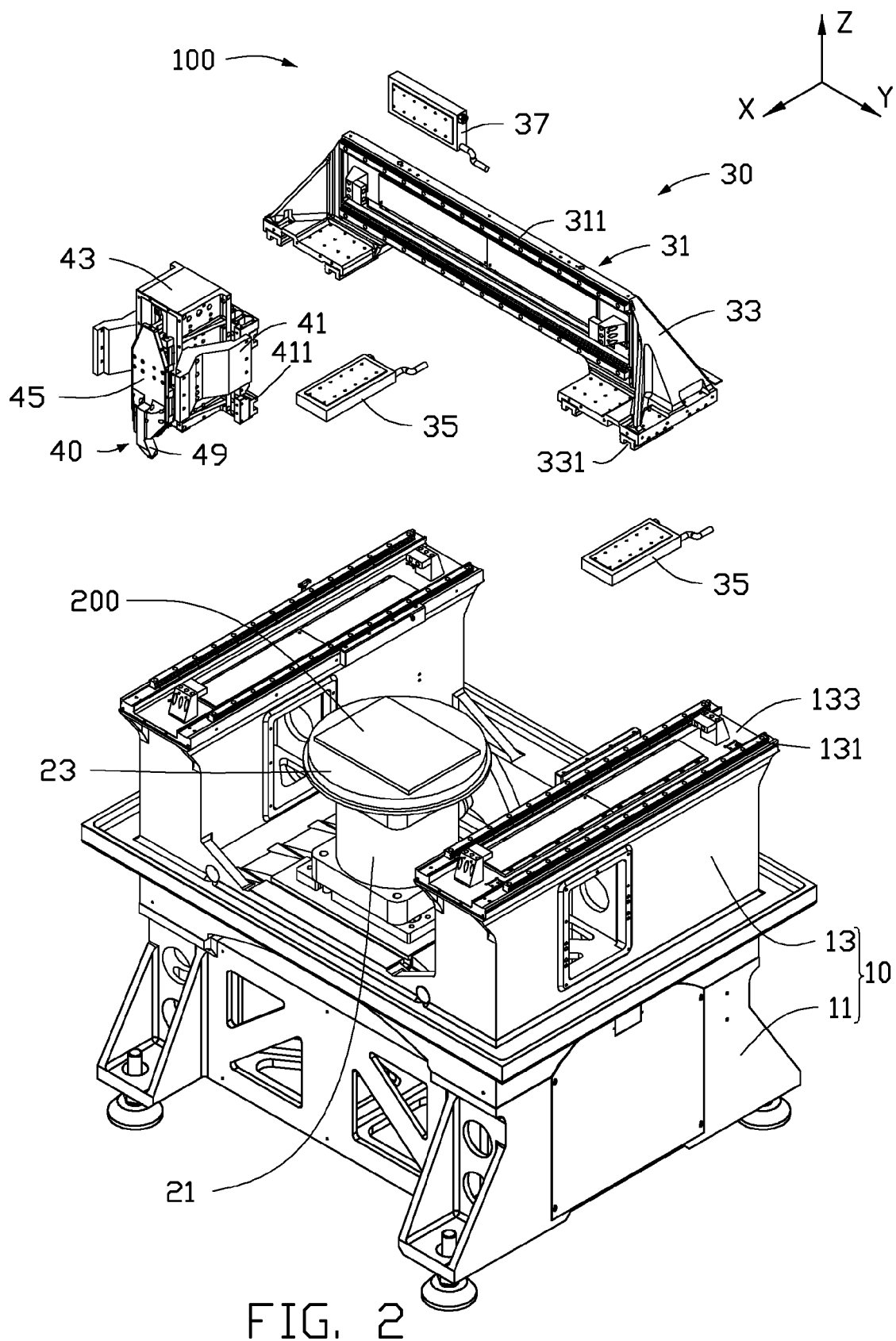
FIG. 2 is an exploded, isometric view of the machine tool of FIG. 1.

Referring to FIGS. 1 and 2, an embodiment of a machine tool 100 is shown. The machine tool 100 is used for machining a curved surface at a workpiece 200. The machine tool 100 includes a machine support 10, a work table 20, a moving device 30, a feeding device 40, and a controller (not shown). The work table 20 holds the workpiece 200 and is supported by the machine support 10. The moving device 30 is movably positioned on the machine support 10 above the work table 20. The feeding device 40 is slidably mounted on the moving device 30. The controller is electrically connected with the work table 20, the moving device 30, and the feeding device 40 for controlling the machine tool 100. Under the control of the controller, the moving device 30 can be driven to move with the feeding device 40, such that the feeding device 40 can be driven to move along X, Y, and Z axes.

The machine support 10 includes a base 11 and a pair of support bodies 13 positioned parallel on the base 11. A pair of first sliding rails 131 are positioned parallel on a surface of each support body 13 away from the base 11, and arranged apart from each other. In the illustrated embodiment, the first sliding rails 131 extend parallel to the X-axis. A receiving groove 133 is formed on each support body 13 between the two first sliding rails 131.

Referring also to FIG. 2, the work table 20 is substantially cylindrical, and rotatably positioned on the base 11 between the two support bodies 13. The work table 20 includes a rotating driver 21 and a support member 23 fixedly connected with the rotating driver 21 away from the base 11. The rotating driver 21 is electrically connected with the controller. In the illustrated embodiment, the rotating driver 21 is a direct drive motor.

The moving device 30 is slidably perpendicularly mounted on the pair of support bodies 13 above the work table 20. The moving device 30 includes a cross beam 31, two sliding bases 33, two first driving mechanisms 35, and a second driving mechanism 37. Two ends of the cross beam 31 are slidably positioned on the support bodies 13 via the pair of sliding bases 33, respectively. The extending direction of the cross beam 31 is parallel to the Y-axis. The pair of second sliding rails 311 are positioned on a side surface of the cross beam 31 adjacent to the work table 20 and extending parallel to the Y-axis. The two sliding bases 33 are installed on the opposite ends of the cross beam 31 to slidably connect with the first sliding rails 131. Each first driving mechanism 35 is mounted on a surface of one sliding base 33 away from the cross beam 31 and received in the receiving groove 133. The first driving mechanisms 35 are configured for driving the cross beam 31 to move along the first sliding rails 131. The second driving mechanism 37 is mounted on the cross beam 31 to drive the feeding device 40 to move along the second sliding rails 311. The first driving mechanisms 35 and the second driving mechanism 37 are electrically connected with the controller. In the illustrated embodiment, the first driving mechanisms 35 and the second driving mechanism 37 are linear motors. In other embodiments, the first driving mechanisms 35 and the second driving mechanism 37 may be replaced by other drivers, such as the cylinders. The number of the first driving mechanisms 35 and the second driving mechanism 37 may be designed according to their applications.

Figure 3:
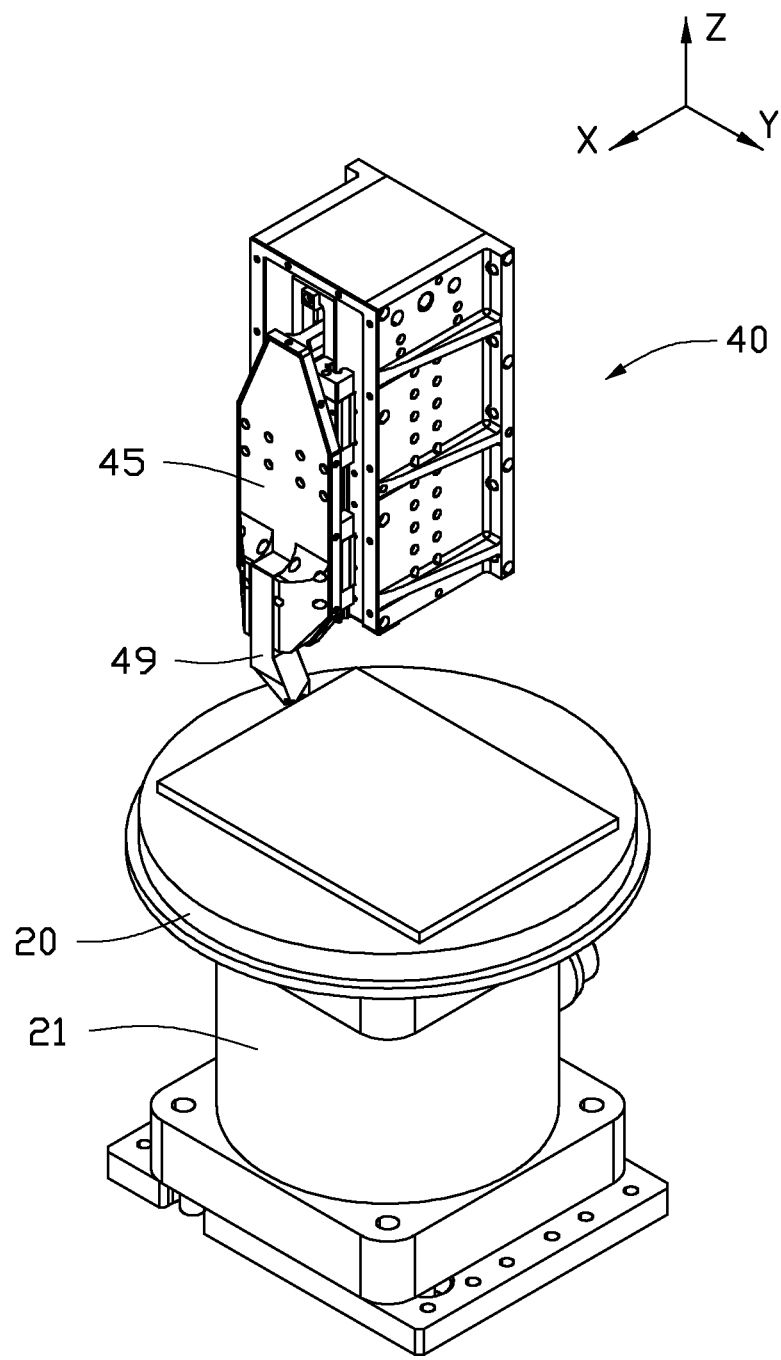
FIG. 3 shows an isometric view of the feeding device machining a workpiece.
Figure 4:
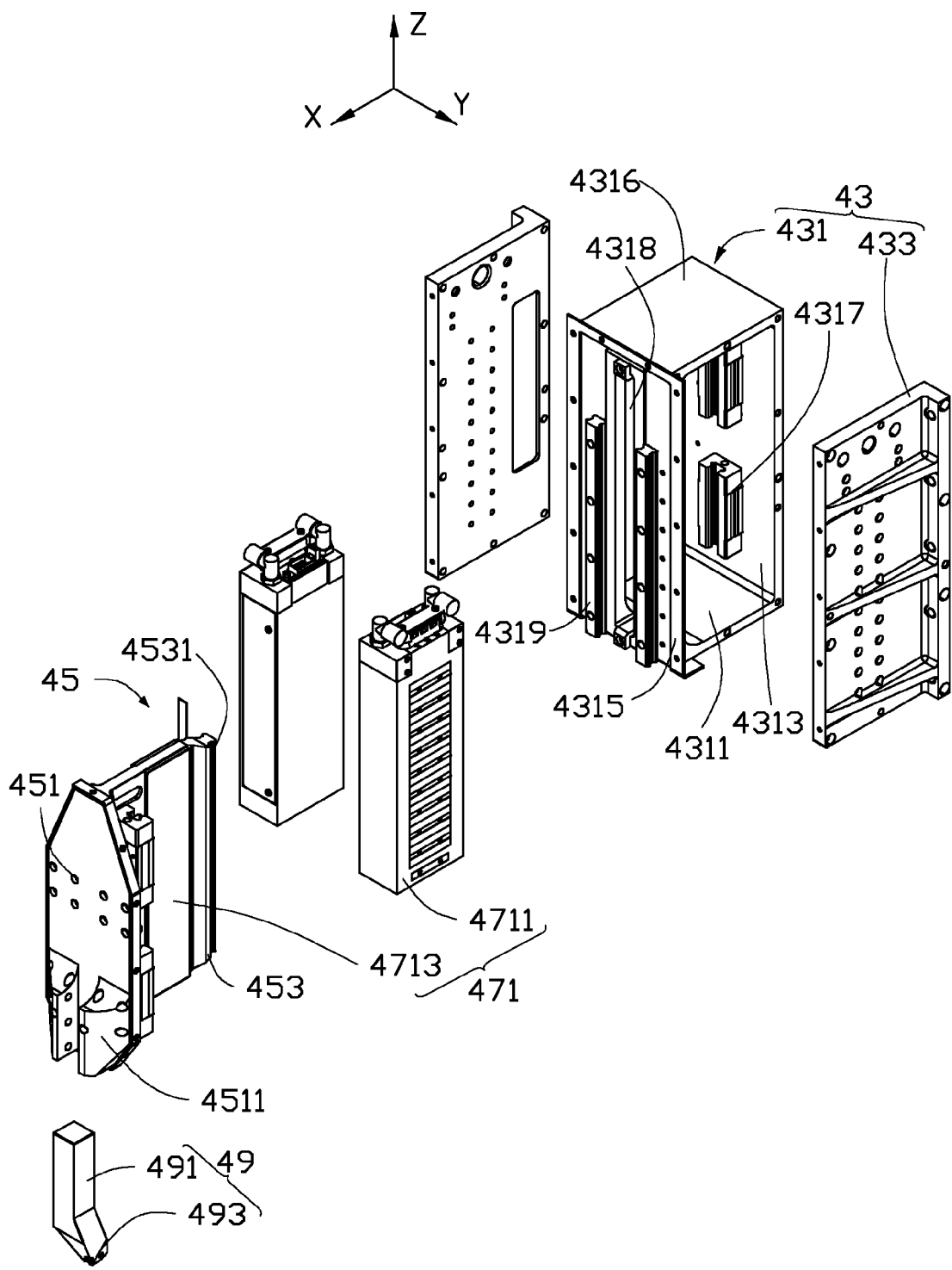
FIG. 4 is an exploded, isometric view of the feeding device of FIG. 3.
Figure 5:
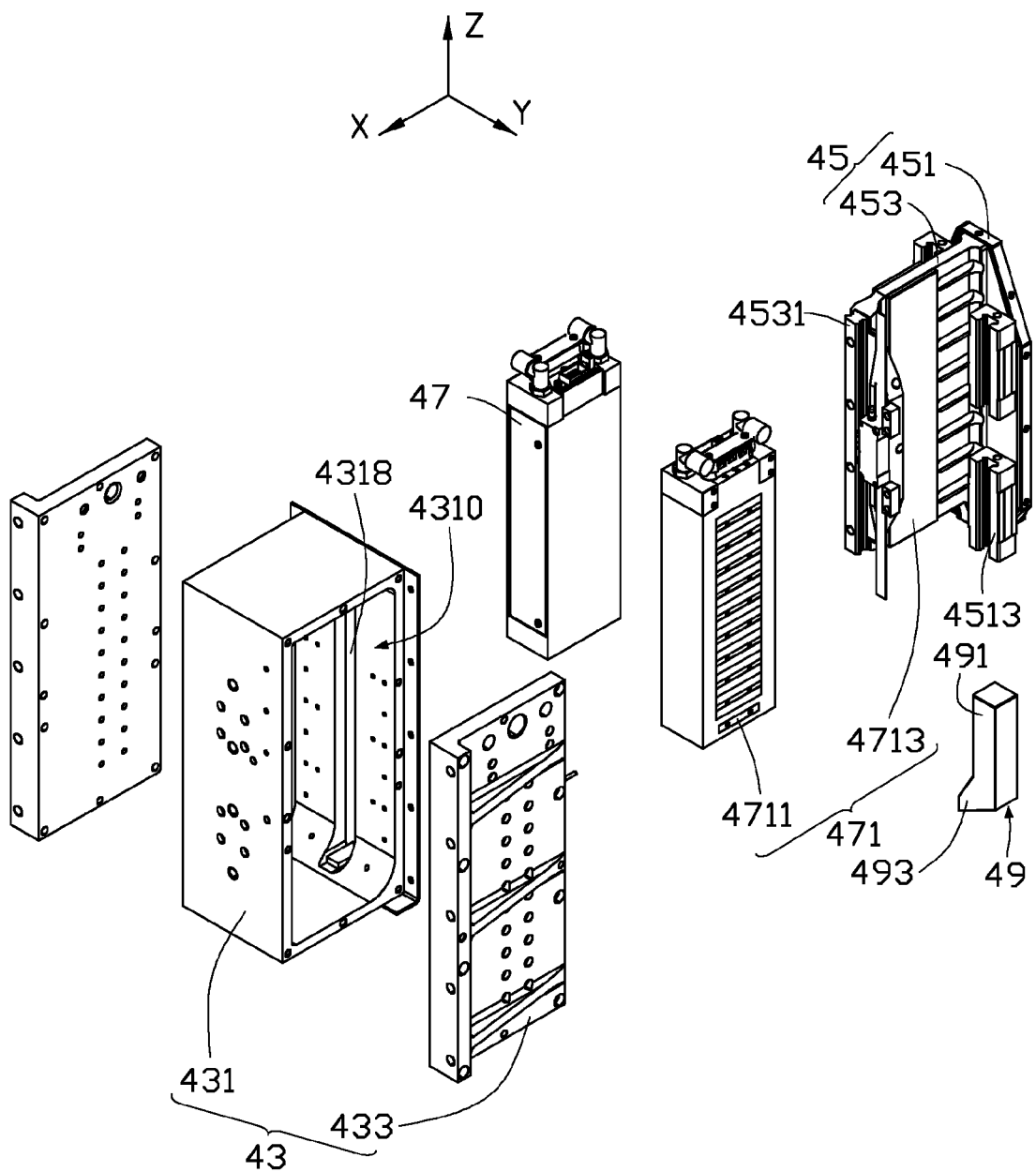
FIG. 5 is similar to FIG. 4, but viewed from another aspect.

Also referring to FIGS. 3 to 5, the feeding device 40 includes a mounting seat 43, a tool holder 45, two feeding mechanisms 47, and a cutting tool 49. The feeding mechanisms 47 are mounted and received in the mounting seat 43, and electrically connected with the controller. The tool holder 45 is slidably positioned on the mounting seat 43, and driven to undergo a reciprocating motion parallel to the Z-axis relative to the mounting seat 43.

In the illustrated embodiment, referring again to FIG. 2, the feeding device 40 further includes a sliding saddle 41. The sliding saddle 41 is movably positioned on the mounting seat 43, and movably assembled with the cross beam 31. Two sliding blocks 411 are separately positioned on a surface of the sliding saddle 41 away from the tool holder 45, and parallel to the Y-axis toward the cross beam 31. The sliding blocks 411 are slidably engaged with the second sliding rails 311 correspondingly.

The mounting seat 43 includes a frame 431, and two mounting boards 433. The frame 431 includes a bottom wall 4311, a first side wall 4313, a second side wall 4315, and a top wall 4316. The first side wall 4313 and the second side wall 4315 extend perpendicularly from two ends of the bottom wall 4311 to connect with the top wall 4316, such that the bottom wall 4311, the first side wall 4313, the second side wall 4315, and the top wall 4316 cooperatively define a receiving space 4310. The bottom wall 4311 is positioned adjacent to the base 11. The first side wall 4313 is slidably connected with the sliding saddle 41. Two guiding portions 4317 protrude from an inner surface of the first side wall 4313 facing toward the second side wall 4315 and extend parallel to the Z-axis. A through groove 4318 is defined in the second side wall 4315 and extends along a direction parallel to the Z-axis. Two guiding portions 4319 protrude from an outer surface of the second side wall 4315 at two sides of the through groove 4318. In the illustrated embodiment, the guiding portions 4319 are sliding rails, and the frame 431 is integrally formed. Two mounting boards 433 are respectively installed on two opening sides of the frame 431. Each mounting board 433 is perpendicularly connected with the bottom wall 4311, the first side wall 4313, the second side wall 4315, and the top wall 4316 for closing the frame 431.

The tool holder 45 slidably connects with the mounting seat 43. The tool holder 45 is substantially "T" shaped, and includes a main body 451 and a sliding board 453 substantially perpendicularly protruding from the main body 451. The main body 451 is a bar of material tapering in at both ends and positioned outside of the mounting seat 43. Two holding portions 4511 are positioned on a bottom of the main body 451 away from the sliding board 453. Four first direct portions 4513 (see FIG. 5) are positioned on a surface of the main body 451 adjacent to the sliding board 453. The four first direct portions 4513 are divided into two groups, each group having two gliding portions 4513 slidably engaged with one guiding portion 4319. The sliding board 453 is located between the two groups of the first direct portions 4513. The sliding board 453 passes through the through groove 4318 and is slidably attached to the two guiding portions 4317. A second direct portion 4531 is formed on an end of the sliding board 453 away from the main body 451, and received in the guiding portion 4317. In the illustrated embodiments, the first direct portions 4513 are sliding blocks, and the second direct portion 4531 is a sliding rail.

The feeding mechanism 47 is mounted in the mounting seat 43, and includes two drivers 471. In the illustrated embodiment, the drivers 471 are linear motors. Each driver 471 includes a forcer 4711 and a stator 4713. Each forcer 4711 is fixed to a surface of the corresponding mounting board 433 facing the receiving space 4310, and is received in the receiving space 4310. The sliding board 453 is positioned between the two forces 4711. The forcers 4711 produce alternating magnetic fields when the forcers 4711 are electrically connected with an alternating current. Two stators 4713 are respectively fixedly positioned on the opposite surfaces of the sliding board 453. Each stator 4713 is located between one forcer 4711 and the sliding board 453. Interactions between magnetic fields produced by the stators 4713 and the alternating magnetic fields which are produced by the forcers 4711 drive the tool holder 45 to move in a reciprocating motion at high speed along the direction of the Z-axis. In other embodiments, the number of drivers 471 may be designed according to the real application. For example, the two drivers 471 can be take the place of a driver with more driving force, or three or more drivers can be positioned to drive the tool holder 45 to maximize energy, and assembly of the drivers can be made easy.

The cutter 49 is fixedly clamped between the two holding portions 4511 for machining curved surfaces of the workpiece 200. The cutter 49 includes a shank 491 and a cutter body 493 connected with the shank 491. The shank 491 is fixedly located between the two holding portions 4511. The cutters body 493 is positioned adjacent to the base 11. In the illustrated embodiment, the cutter 49 is a lathe tool.

In other embodiments, the mounting seat 43 may be fixedly positioned on the sliding saddle 41 when the machine tool 100 machines the workpieces 200 of one type. In other words, the mounting seat 43 does not need to move along the Z-axis direction. A driving mechanism electrically connected with the controller may be positioned in the feeding device 40 to drive the mounting seat 43 to slide along the sliding saddle 41 in the Z-axis. The sliding saddle 41 may be omitted, and the mounting seat 43 can be directly slidably positioned on the cross beam 31.

In other embodiments, the forcers 4711 may be directly installed on the frame 431. The alternating magnetic fields produced by the forcers 4711 drive the stators 4713, thereby causing the tool holder 45 to undergo a reciprocating motion at high speed along the guiding portions 4317.

In assembly, the work table 20 is positioned between the two support bodies 13. The cross beam 31 is installed on the two support bodies 13. The first driving mechanism 35 and the second mechanism 37 are mounted on the cross beam 31. The sliding saddle 41 is also correspondingly positioned on the cross beam 31. The two stators 4713 are fixedly mounted on two surfaces of the sliding board 453, respectively. The sliding board 453 passes through the through groove 4318 and slidably connected with the second direct portion 4531. Each forcer 4711 is installed on one mounting board 433 and received in the mounting seat 43 together with the mounting board 433. The cutter 49 is fixedly mounted between the two holding portions 4511. Finally, the feeding device 40 is positioned on the sliding saddle 41 and electrically connected with the controller.

In use, the workpiece 200 is placed on the work table 20. The first driving mechanism 35 drives the moving device 30 to move along the first sliding rails 131 in the X-axis direction, the driving mechanism 37 drives the moving device 30 to move along the second sliding rails in the Y-axis direction, and the mounting seat 43 slides back and forth on the sliding saddle 41 in the Z-axis direction under the control of the controller. The feeding device 40 arrives at a preset position for machining. The first driving mechanism 35 drives the moving device 30 to move along the first sliding rails 131 in the X-axis direction, the rotating driver 21 drives the workpiece to rotate, and the cutter 49 is driven to reciprocate at high speed in the Z-axis direction by the drivers 471 for machining the workpiece 200 at the same time. The rotating speed of the rotating driver 21, and the speed and the amplitude of the cutter 49 are programmed according to cutting removal of each machining portion of the workpiece 200. The planar machining path of the cutter 49 is substantially spiral. The feeding device 40 and the work table 20 stop moving, and the moving device 30 returns to its initial position after completing machining. The workpiece 200 can then be unloaded from the work table 20.

The interaction between the alternating magnetic fields produced by the forcers 4711 and the magnetic fields produced by the stators 4713, will drive the tool holder 45 and the cutter 49 to reciprocate at high speed along the guiding portion 4317 in the Z-axis for curved surface machining the workpiece 200. The feeding device 40 machines the workpiece 200 all the time depending on its motions at high speed in the Z-axis. There is no need to move the feeding device 40 during machining. Much time will be saved compared with the traditional feeding device, and the maximum machining efficiency will be achieved. Traditionally, a milling cutter with different cutting edges is used for machining curved surfaces. Some trace will retain on the milling surface of the workpiece because of discontinuous milling of the milling cutter. A polishing process would need to be performed on the workpiece. However, no other process needs to be added to the workpiece 200 used by the machine tool 100 because the cutter 49 is continuously machining.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A feeding device, comprising:
a tool holder;
a feeding mechanism, comprising at least one driver, and the at least one driver comprising a forcer and a stator;
a cutter positioned on the tool holder; and
a mounting seat having at least one guiding portion, wherein the tool holder is slidably engaged with the at least one guiding portion, and the feeding mechanism drives the tool holder and the cutter to controllably reciprocate along the at least one gliding portion,
wherein the at least one forcer is mounted in the mounting seat, the at least one stator is fixedly positioned on the tool holder, and alternating magnetic fields produced by the at least one forcer interacting with the magnetic fields produced by the at least one stator.

2. The feeding device of claim 1, wherein the tool holder comprises a main body and a sliding board protruding from the main body, the sliding board extends into the mounting seat and slidably connects with at least one guiding portion, and the main body is positioned outside of the mounting seat and fixedly connects with the cutter.

3. The feeding device of claim 1, wherein the mounting seat comprises a frame defining two opening sides, and two mounting boards mounted on the frame to close the two opening sides of the frame, the at least one guiding portion is positioned on an inner surface of the frame, and the at least one forcer is mounted on the two mounting boards and received in the frame.

4. The feeding device of claim 3, wherein the frame comprises a bottom wall, a first side wall, a second side wall, and a top wall, the first side wall and the second side wall extend from two ends of the bottom wall, the top wall is connected with the first side wall and the second side wall and positioned away from the bottom wall, the at least one guiding portion is formed on a surface of the first side wall facing the first side wall; the bottom wall, the first side wall, the second side wall, and the top wall cooperatively form the frame defining the two opening sides.

5. The feeding device of claim 4, wherein a through groove is defined though the second side wall, the sliding board passes through the through groove.

6. The feeding device of claim 2, wherein the mounting seat further comprises a mounting seat body and the at least one guiding portion protruding from a side surface of the mounting seat body towards the main body, the main body comprises at least one first direct portion slidably connected with one guiding portion.

7. The feeding device of claim 2, wherein the sliding board comprises a sliding board body and a second direct portion positioned on the end of the sliding board body away from the main body and slidably attached to the at least one guiding portion.

8. A machine tool, comprising:
a machine support;
a work table positioned on the machine support,
a moving device mounted on the machine support above the work table, the moving device comprising a cross beam and at least one first driving mechanism, the cross beam being slidably connected with the machine support above the work table, and the at least one first driving mechanism driving the cross beam to move on the machine support; and
a feeding device comprising a tool holder, a feeding mechanism, a cutter positioned on the tool holder, and a mounting seat positioned on the moving device, wherein the mounting seat comprises at least one guiding portion, the tool holder is slidably engaged with the at least one guiding portion, and the feeding mechanism drives the tool holder and the cutter to controllably reciprocate along the at least one gliding portion.

9. The machine tool of claim 8, wherein the feeding device further comprises a sliding saddle, and the mounting seat is slidably connected with the moving device via the sliding saddle.

10. The machine tool of claim 8, wherein the machine support comprises a base and two support bodies positioned parallel on the base, the cross beam is slidably connected with the two support bodies, and the at least one first driving mechanism drives the cross beam to move along the support bodies.

11. The machine tool of claim 8, wherein the moving device further comprises at least one second mechanism mounted on the cross beam for driving the feeding device to move along the cross beam.

12. A machine tool, comprising:
a machine support;
a work table positioned on the machine support:
a moving device mounted on the machine support above the work table; and
a feeding device comprising a tool holder, a feeding mechanism, a cutter positioned on the tool holder; and a mounting seat fixedly positioned on the moving device, wherein the mounting seat comprises at least one guiding portion, the tool holder is slidably engaged with the at least one guiding portion, the feeding mechanism drives the tool holder and the cutter to controllably reciprocate along the at least one guiding portion, and the cutter is a lathe tool.

13. The machine tool of claim 12, wherein the moving device comprises a cross beam and at least one first driving mechanism, the cross beam is slidably connected with the machine support above the work table, and the at least one first driving mechanism drives the cross beam to move along the machine support.

14. The machine tool of claim 13, wherein the machine support comprises a base and two support bodies positioned parallel on the base, the cross beam is slidably connected with the two support bodies, and the at least one first driving mechanism drives the cross beam to move along the support bodies.

15. The machine tool of claim 12, wherein the tool holder comprises a main body and a sliding board protruding from the main body, the sliding board extends into the mounting seat and slidably connects with the at least one guiding portion, and the main body is positioned outside of the mounting seat and fixedly connects with the cutter.

16. The machine tool of claim 15, wherein the feeding mechanism comprises at least one driver, the at least one driver comprises a forcer and a stator, the at least one forcer is mounted in the mounting seat, the at least one stator is fixedly positioned on the sliding board, and alternating magnetic fields produced by the at least one forcer interacting with the magnetic fields produced by the at least one stator.

17. The machine tool of claim 16, wherein the mounting seat comprises a frame having two opening sides, and two mounting boards mounted on the frame to close the opening sides of the frame, the at least one guiding portion is positioned on an inner surface of the frame, and the at least one forcer is mounted on the two mounting boards and received in the frame.

\* \* \* \* \*